US009465670B2

(12) United States Patent
Grochowski et al.

(10) Patent No.: US 9,465,670 B2
(45) Date of Patent: Oct. 11, 2016

(54) GENERATIONAL THREAD SCHEDULER USING RESERVATIONS FOR FAIR SCHEDULING

(75) Inventors: Edward T. Grochowski, San Jose, CA (US); Michael D. Upton, Seattle, WA (US); George Z. Chrysos, Portland, OR (US); Chunhui C. Zhang, Hillsboro, OR (US); Mohammed L. Al-Aqrabawi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1121 days.

(21) Appl. No.: 13/328,365

(22) Filed: Dec. 16, 2011

(65) Prior Publication Data

US 2013/0160020 A1 Jun. 20, 2013

(51) Int. Cl.
*G06F 9/52* (2006.01)
*G06F 9/50* (2006.01)
*G06F 9/46* (2006.01)

(52) U.S. Cl.
CPC ......... *G06F 9/52* (2013.01); *G06F 2209/5014* (2013.01)

(58) Field of Classification Search
None
See application file for complete search history.

(56) References Cited

U.S. PATENT DOCUMENTS

| 5,630,074 | A | 5/1997 | Beltran |
| 5,737,747 | A | 4/1998 | Vishlitzky et al. |
| 5,751,997 | A | 5/1998 | Kullick et al. |
| 5,872,941 | A | 2/1999 | Goodrum et al. |
| 6,182,112 | B1 * | 1/2001 | Malek et al. ................. 709/201 |
| 6,212,544 | B1 | 4/2001 | Borkenhagen et al. |
| 6,243,778 | B1 | 6/2001 | Fung et al. |
| 6,298,386 | B1 | 10/2001 | Vahalia et al. |
| 6,330,548 | B1 | 12/2001 | Walker et al. |
| 6,330,584 | B1 | 12/2001 | Joffe et al. |
| 6,349,297 | B1 | 2/2002 | Shaw et al. |

(Continued)

FOREIGN PATENT DOCUMENTS

| EP | 0507061 | 7/1992 |
| WO | WO 0197020 | 12/2001 |

OTHER PUBLICATIONS

Tullsen, et al., "Supporting Fine-Grained Synchronization on a Simultaneous Multlithreading Processor", Proceedings of the 5th International Symposium on High Performance Computer Architecture, Jan. 1999, 5 pages.

(Continued)

*Primary Examiner* — Eric C Wai
(74) *Attorney, Agent, or Firm* — Nicholson De Vos Webster & Elliott LLP

(57) ABSTRACT

Disclosed herein is a generational thread scheduler. One embodiment may be used with processor multithreading logic to execute threads of executable instructions, and a shared resource to be allocated fairly among the threads of executable instructions contending for access to the shared resource. Generational thread scheduling logic may allocate the shared resource efficiently and fairly by granting a first requesting thread access to the shared resource allocating a reservation for the shared resource to each other requesting thread of the executing threads and then blocking the first thread from re-requesting the shared resource until every other thread that has been allocated a reservation, has been granted access to the shared resource. Generation tracking state may be cleared when each requesting thread of the generation that was allocated a reservation has had their request satisfied.

20 Claims, 7 Drawing Sheets

(56) References Cited

U.S. PATENT DOCUMENTS

| | | |
|---|---|---|
| 6,363,453 B1 | 3/2002 | Esposito et al. |
| 6,542,921 B1 | 4/2003 | Sager |
| 6,981,110 B1 | 12/2005 | Melvin |
| 7,165,257 B2 | 1/2007 | Musoll et al. |
| 7,257,814 B1 | 8/2007 | Melvin et al. |
| 2002/0065864 A1 | 5/2002 | Hartsell et al. |
| 2002/0078119 A1 | 6/2002 | Brenner et al. |
| 2002/0087687 A1 | 7/2002 | Zaifman et al. |
| 2002/0095400 A1 | 7/2002 | Johnson et al. |
| 2002/0120741 A1 | 8/2002 | Webb et al. |
| 2002/0194244 A1 | 12/2002 | Raventos |
| 2003/0033386 A1 | 2/2003 | Dahlen et al. |
| 2003/0074390 A1 | 4/2003 | Hudson |
| 2006/0218556 A1* | 9/2006 | Nemirovsky et al. ........ 718/104 |
| 2009/0067327 A1* | 3/2009 | Siemens et al. ............. 370/230 |
| 2009/0328053 A1 | 12/2009 | Dice |
| 2011/0055524 A1 | 3/2011 | Marden et al. |
| 2011/0276783 A1 | 11/2011 | Golla et al. |

OTHER PUBLICATIONS

Office action and Search Report with English translation from Taiwan Patent Application No. 101147516, mailed Jan. 21, 2016, 14 pages.

PCT/US2012/069448 Notification of Transmittal of the International Search Report and the Written Opinion of the International Searching Authority, mailed Mar. 26, 2013, 9 pages.

PCT/US2012/09448 Notification Concerning Transmittal of Copy of International Preliminary Report on Patentability, mailed Jun. 26, 2014, 6 pages.

* cited by examiner

GENERATIONAL THREAD SCHEDULER USING RESERVATIONS FOR FAIR SCHEDULING

FIELD OF THE DISCLOSURE

This disclosure relates generally to the field of microprocessors. In particular, the disclosure relates to a scheduler for efficiently and fairly scheduling shared resources among threads of instructions in a multithreaded processor.

BACKGROUND OF THE DISCLOSURE

In multiprocessing, processors may employ multithreading logic to execute a plurality of threads of executable instructions. These threads of executable instructions may also share processor execution resources such as, for example, a page miss handler, or a hardware page walker, or a cache fill buffer, or some other execution resource.

A thread picker may choose one of several threads from which to issue instructions for execution. The thread picker may use a nominally round-robin algorithm so that all threads have equal access to the execution hardware. In some cases the thread picker may deviate from round-robin if the resources needed by a thread are temporarily unavailable. The thread picker may attempt to maintain fairness of resource allocation by dynamically computing resource thresholds for competing threads and filtering out those threads that have exceeded their resource thresholds. This may require the thread picker to store and maintain additional state information, for example thresholds, for shared resources and threads regardless of their actual shared resource use.

Some processor execution resources may require multiple clocks to service a request. For example, a hardware page walker may need tens of clock cycles to walk the page tables. This may give rise to a problem, in that once one thread has successfully sent a request to the shared resource, and the resource becomes busy, other threads that subsequently request access to the resource will be denied until the resource becomes available. If no provisions are made to ensure fairness, it is possible that the resource may be acquired again and again by the same thread, or alternatively by some subset of all of the threads. Consequently, this may permit a condition whereby a small number of threads hog a resource for long periods of time. Eventually, a live-lock detector may elevate priority levels to prevent a thread from experiencing complete starvation, but such techniques do not suffice to prevent an unfair allocation of processor execution resources from reoccurring.

To date, efficient logic and structures for fairly scheduling shared resources among contending threads of instructions in multithreaded processors have not been fully explored.

BRIEF DESCRIPTION OF THE DRAWINGS

The present invention is illustrated by way of example and not limitation in the figures of the accompanying drawings.

DETAILED DESCRIPTION

Methods and apparatus for a generational thread scheduler are disclosed herein. One embodiment may be used with processor multithreading logic to execute threads of executable instructions, and to allocate a shared resource fairly among the threads of executable instructions contending for access to the shared resource. Generational thread scheduling logic can allocate the shared resource efficiently and fairly by granting a first requesting thread access to the shared resource and allocating a reservation for the shared resource to each requesting thread of the executing threads. Generational thread scheduling logic then blocks threads from re-requesting the shared resource until every other thread that has been allocated a reservation, has also been granted access to the shared resource. Generation tracking state may be cleared when each requesting thread of the generation that was allocated a reservation has had access to the shared resource.

Thus, a generational thread scheduler may allocate a shared processor execution resource fairly among requesting threads of executable instructions contending for access to the shared resource over each generation of requests. It will be appreciated that such a mechanism may avoid unbalanced degradation in performance for some threads due to unfair allocation of access to shared processor execution resources during periods of contention for those execution resources. It will be appreciated that while the description below typically refers to a shared resource being requested by threads of executable instructions, the invention is not so limited. The techniques herein described may be applicable to requesting hardware devices, or software processes, or firmware, or any other types of requesting entities alone or in combination.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than a restrictive sense and the invention measured only in terms of the claims and their equivalents.

Figure 1:
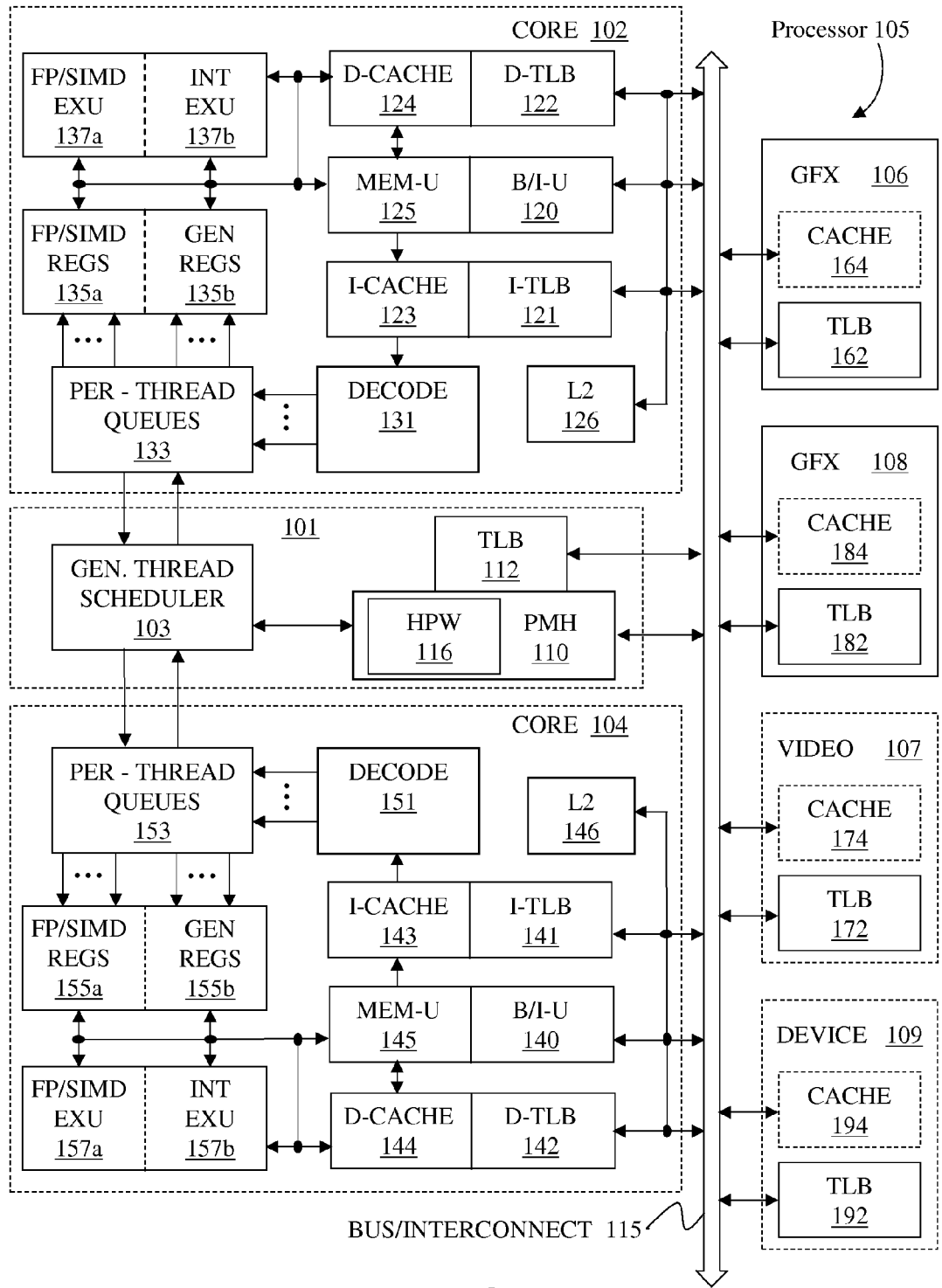
FIG. 1 illustrates one embodiment of a multithreaded processor using a mechanism for efficiently and fairly scheduling shared resources among multiple threads of instructions.

FIG. 1 illustrates one embodiment of a multithreaded processor 105 using a mechanism for efficiently and fairly scheduling shared resources among multiple threads of instructions. One embodiment of multithreaded processor 105 includes an apparatus 101 that uses a shared page miss handler, PMH 110 and hardware page walker, HPW 116 for multiple multithreaded processing cores 102-104 and/or other devices to share virtual memory in a multi-core system. Apparatus 101 comprises translation look-aside buffer, TLB 112 to store second level cache (L2) virtual address translation entries. Page-miss handler, PMH 110, is coupled with the TLB 112 to facilitate page walks on page misses using HPW 116 and to populate virtual address translation entries of TLB 112. For some embodiments page-miss handler, PMH 110 and HPW 116 are indistinguishable, although for some first level cache (L1) page misses a page table walk may not be required. For the sake of illustration TLB 112, HPW 116 and PMH 110 are shown as being included in apparatus 101 but it will be appreciated that portions of one or all may be implemented as separate or distributed hardware and/or software data structures and may reside outside of apparatus 101, for example including in main memory.

Apparatus 101 also comprises generational thread scheduler (GTS) 103, which is shown as being included in apparatus 101 but may be implemented as separate hardware or software and may reside outside of apparatus 101.

Apparatus 101 is operatively coupled with bus/interconnect 115 for communicating with a multi-core processor or multi-core processing system having multiple multithreaded processor cores or other processing devices, for sharing virtual memory in the multi-core system. The system may include multiple multithreaded processor cores, two of which are shown as core 102 and core 104, as well as other processing devices such as graphics devices, two of which are shown as GFX 106 and GFX 108, and optionally other processing devices such as video device 107 and device 109.

The multiple processor cores 102 and 104 may be multithreaded cores processing multiple process threads for execution via decode 131 and decode 151, per-thread queues 133 and 153, floating point/single-instruction multiple-data registers FP/SIMD REGS 135a and FP/SIMD REGS 155a, general registers GEN REGS 135b and GEN REGS 155b, floating point/single-instruction multiple-data execution units FP/SIMD EXU 137a and FP/SIMD EXU 157a, and integer execution units INT EXU 137b and INT EXU 157b, respectively. Core 102 and core 104 may also be coupled with external memory (not shown) via a bus/interconnect 115 and memory units MEM-U 125 and MEM-U 145 through bus/interconnect units B/I-U 120 and B/I-U 140, respectively. Core 102 and core 104 may also be coupled with graphics processing devices GFX 106 and GFX 108, and optionally other heterogeneous processing devices such as video device 107 and device 109 via external memory and bus/interconnect 115, and optionally via a last level cache (not shown).

These multiple processing cores or other processing devices may also share virtual memory address spaces via external physical memory and optionally through a last level cache (not shown). Typically, the processor cores 102 and 104 may have cache hierachies, e.g. I-cache 123, D-cache 124, L2 126 and I-cache 143, D-cache 144, L2 146, respectively; and TLBs, e.g. I-TLB 121, D-TLB 122 and I-TLB 141, D-TLB 142, respectively to cache virtual to physical address translations from the system page tables in a paged virtual memory system.

The graphics processors, GFX 106 and GFX 108, and optionally other processing devices such as video device 107 and device 109 may also have mechanisms such as TLBs, e.g. TLB 162, TLB 182, TLB 172 and TLB 192, respectively, for performing virtual to physical address translations. Various embodiments of TLB 162, TLB 182, TLB 172 and TLB 192, respectively, may or may not have the same capabilities, or capabilities comparable to homogeneous processor cores 102 and 104. The graphics processing devices GFX 106, GFX 108, and optionally video device 107 and device 109 may also have caches, e.g. cache 164, cache 184, cache 174 and cache 194, respectively.

If one or more threads of processor cores 102 and 104, graphics processing devices GFX 106, GFX 108, and optionally video device 107 and device 109, while accessing their TLBs via a TLB lookup, generate a page miss, then they may send a page miss requests to shared PMH 110 of apparatus 101. Apparatus 101 may receive one or more page miss requests, e.g. in a page miss request queue, from one or more respective requesting threads on devices of a plurality of devices, processor cores 102 and 104, graphics processing devices GFX 106, GFX 108, and optionally video device 107 and device 109, in the multi-core system.

When processing a page miss request from one of the requesting devices, apparatus 101 may include generational thread scheduler 103 in order to arbitrate and identify which page miss request of the one or more requesting threads to process. In some embodiments, generational thread scheduler 103 may be used with processor cores 102 and 104 multithreading logic, and per-thread queues 133 and 153, to pick threads for execution and to allocate a shared resource fairly, such as a shared PMH 110 and HPW 116 of apparatus 101, among the threads contending for access to the shared resource. Generational thread scheduler 103 can allocate the shared resource efficiently and fairly by granting a first requesting thread access to the shared resource and allocating a reservation for the shared resource to each requesting thread. Generational thread scheduler 103 then blocks the threads from re-requesting the shared resource until every other thread that has been allocated a reservation, has also been granted access to the shared resource. Generation tracking state can be cleared by generational thread scheduler 103 when each requesting thread of the generation that was allocated a reservation has had access to the shared resource.

In some embodiments, generational thread scheduler 103 may allocate access to shared PMH 110 separately from access to shared HPW 116. Apparatus 101 may perform a second local TLB 112 lookup to satisfy the page miss request, and then upon a page miss in TLB 112, generational thread scheduler 103 may allocate access or a reservation to shared HPW 116 to perform a page table walk to generate a physical address responsive to the first page miss request. Upon completion either by shared PMH 110 with or without use of shared HPW 116 the physical address may be sent by communication logic of apparatus 101 to the device of the corresponding requesting thread, or a fault may be signaled by apparatus 101 to an operating system for the corresponding requesting thread responsive to the page miss request.

It will be appreciated that whenever duplicate page miss requests are received by apparatus 101, if any duplicate request has been, or are being processed by PMH 110, the other duplicate requests may be allocated a reservation for PMH 110 and wait to be satisfied along with the first request. Thus handling a duplication of requests from different threads may be performed by generational thread scheduler 103 for the shared PMH 110 and HPW 116 of apparatus 101 when virtual memory space is shared by more devices. Similarly, if the first request generates a page fault due to a page not being present in physical memory, duplicate page fault signals to the operating system for the same reason may be eliminated, while page faults for access rights violations may be preserved but without a duplication of the page walk using shared HPW 116.

Figure 2:
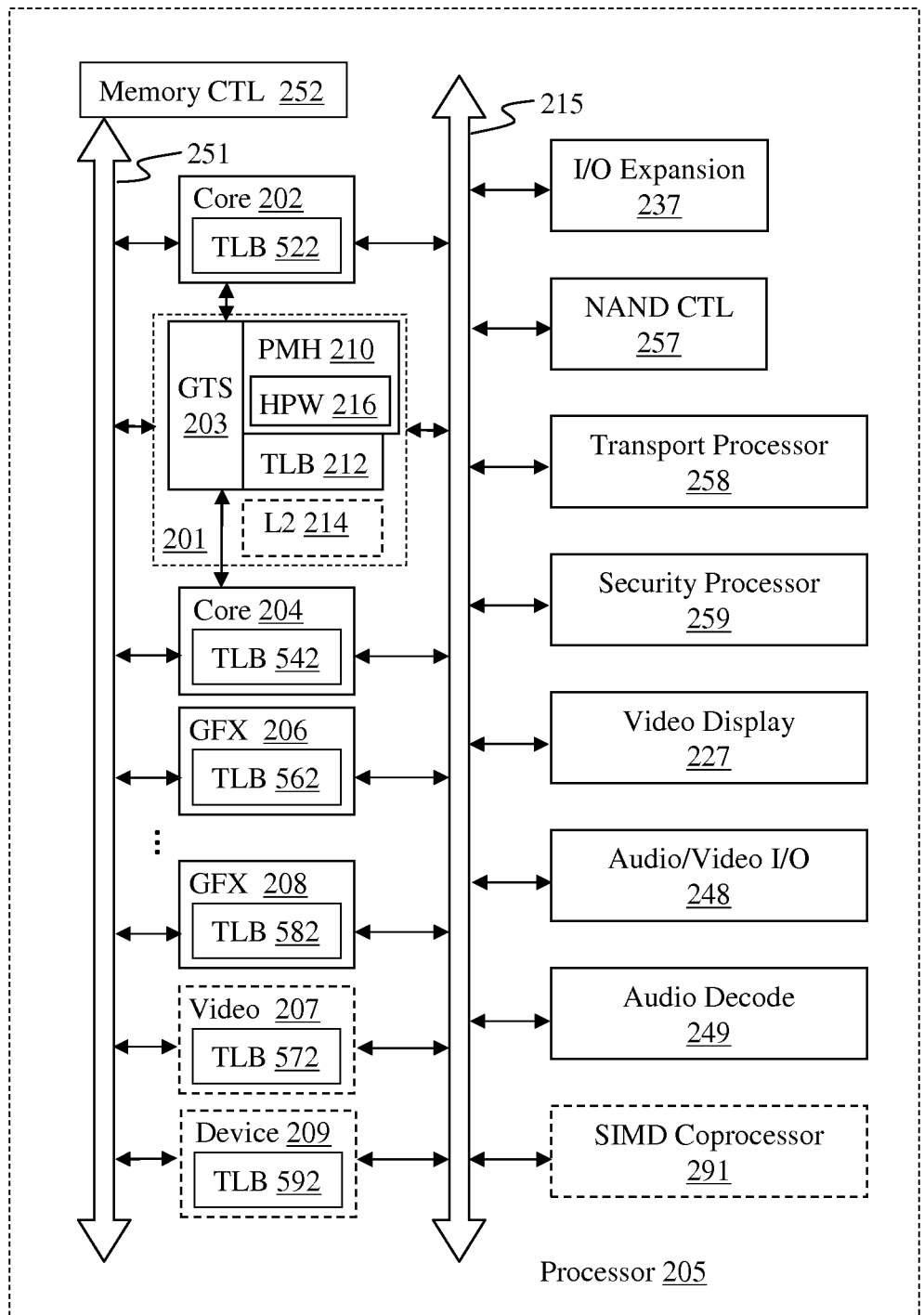
FIG. 2 illustrates another embodiment of a multithreaded processor using a mechanism for efficiently and fairly scheduling shared resources among multiple threads of instructions.

FIG. 2 illustrates another embodiment of a multithreaded processor 205 using a mechanism for efficiently and fairly scheduling shared resources among multiple threads of instructions. One embodiment of processor 205 utilizes a shared page miss handler and/or a shared hardware page walker for threads executing on multiple processing cores or other devices to share virtual memory in a multi-core system. Apparatus 201 of processor 205 comprises TLB 212 to store virtual address translation entries. Page-miss handler, PMH 210, is coupled with the TLB 212 to facilitate page walks using shared hardware page walker, HPW 216, on page misses and to populate virtual address translation entries of TLB 212. For the sake of illustration TLB 212, HPW 216 and PMH 210 are shown as being included in apparatus 201 but it will be appreciated that portions of one or all may be implemented as a separate or a distributed hardware and/or software data structures and reside outside of apparatus 201, for example including in main memory.

Apparatus 201 also comprises generational thread scheduler, GTS 203 and optionally comprises second level cache, L2 214, which are shown as being included in apparatus 201 but may be implemented as separate hardware and/or software and may reside outside of apparatus 201.

Apparatus 201 is operatively coupled with busses/interconnects 215 and 251 for communicating with multi-core processor 205 or a multi-core processing system having multiple multithreaded processor cores and/or other processing devices, for sharing virtual memory, via memory control 252 through external memory (not shown) in the multi-core system. The system may include multiple multithreaded processor cores, two of which are shown as core 202 and core 204, as well as other processing devices such as graphics devices, two of which are shown as GFX 206 and GFX 208, and optionally other processing devices such as video device 207 and device 209.

The multiple processor cores 202 and 204 may be multithreaded cores processing multiple process threads for execution as described, for example, with regard to FIG. 1. Core 202 and core 204 may be coupled with various devices via a bus/interconnect 215, e.g. I/O expansion device 237, NAND control 257, transport processor 258, security processor 259, video display logic 227, audio/video I/O 248, audio decode logic 249, and optionally single instruction multiple data (SIMD) coprocessor 291. Core 202 and core 204 may also be coupled with external memory via a bus/interconnect 251 and memory control 252. Core 202 and core 204 may also be coupled with graphics processing devices GFX 206 and GFX 208, and optionally other processing devices such as video device 207 and device 209 via external memory and bus/interconnects 215 and 251 and optionally via a last level cache (not shown).

These multiple processing cores or other processing devices may share virtual memory address spaces via an external main memory and optionally through last level cache (not shown). Typically, the processor cores may have cache hierarchies, and TLBs, e.g. TLB 222 and TLB 242, respectively to cache virtual to physical address translations from the system page tables in a paged virtual memory system.

The graphics processing devices, GFX 206 and GFX 208, and optionally other processing devices such as video device 207 and device 209 may also have mechanisms such as TLBs, e.g. TLB 262, TLB 282, TLB 272 and TLB 292, respectively, for performing virtual to physical address translations. Various embodiments of TLB 262, TLB 282, TLB 272 and TLB 292, respectively, may or may not have the same capabilities, or capabilities comparable to processor cores 202 and 204.

If one or more of processor cores 202 and 204, graphics processing devices GFX 206, GFX 208, and optionally video device 207 and device 209, while accessing their TLBs via a TLB lookup, generate a page miss, then they may send a page miss requests to the shared PMH 210 of apparatus 201. Apparatus 201 may receive one or more page miss requests from one or more respective requesting devices of the plurality of devices, processor cores 202 and 204, graphics processing devices GFX 206, GFX 208, and optionally video device 207 and device 209, in the multi-core system by any suitable means, e.g. such as a request queue.

When processing a page miss request from one of the requesting devices, apparatus 201 may include generational thread scheduler, GTS 203, in order to arbitrate and identify which page miss request of the one or more requesting threads to process. In some embodiments, GTS 203 may be used with processor cores 202 and 204 multithreading picker logic to pick threads for execution and to allocate a shared resource fairly, such as a shared PMH 210 and/or HPW 216 of apparatus 201, among the threads contending for access to the shared resource. Generational thread scheduler, GTS 203, can allocate the shared resource efficiently and fairly by granting a first requesting thread access to the shared resource and allocating a reservation for the shared resource to each requesting thread. Generational thread scheduler, GTS 203, then blocks the threads from re-requesting the shared resource until every other thread that has been allocated a reservation, has also been granted access to the shared resource. Generation tracking state can be cleared by GTS 203 when each requesting thread of the generation that was allocated a reservation has had access to the shared resource.

In some embodiments, portions of PMH 210 may be distributed and/or included in processor cores 202 and 204, or thread scheduler 203 may allocate access to a shared PMH 210 separately from access to a shared HPW 216. Apparatus 201 may perform a second local TLB 212 lookup to satisfy the page miss request, and then upon a page miss in TLB 212, GTS 203 may allocate access or a reservation to the shared HPW 216 to perform a page table walk and generate a physical address responsive to the first page miss request. Upon completion either by shared PMH 210 or by shared HPW 216 the physical address may be sent by communication logic of apparatus 201 to the device of the corresponding requesting thread, or a fault may be signaled by apparatus 201 to an operating system for the corresponding requesting thread responsive to the first page miss request.

It will be appreciated that whenever duplicate page miss requests are received by apparatus 201, if any duplicate request has been, or is being processed by PMH 210, the other duplicate requests may be allocated a reservation for PMH 210 and wait to be satisfied along with the first request. Thus handling a duplication of requests from different threads may be performed by GTS 203 for the shared PMH 210 and HPW 216 of apparatus 201 when virtual memory space is shared by more devices. Similarly, if the first request generates a page fault due to a page not being present in physical memory, duplicate page fault signals to the operating system for the same reason may be eliminated, while page faults for access rights violations may be preserved but without a duplication of the page walk using HPW 216.

Figure 3:
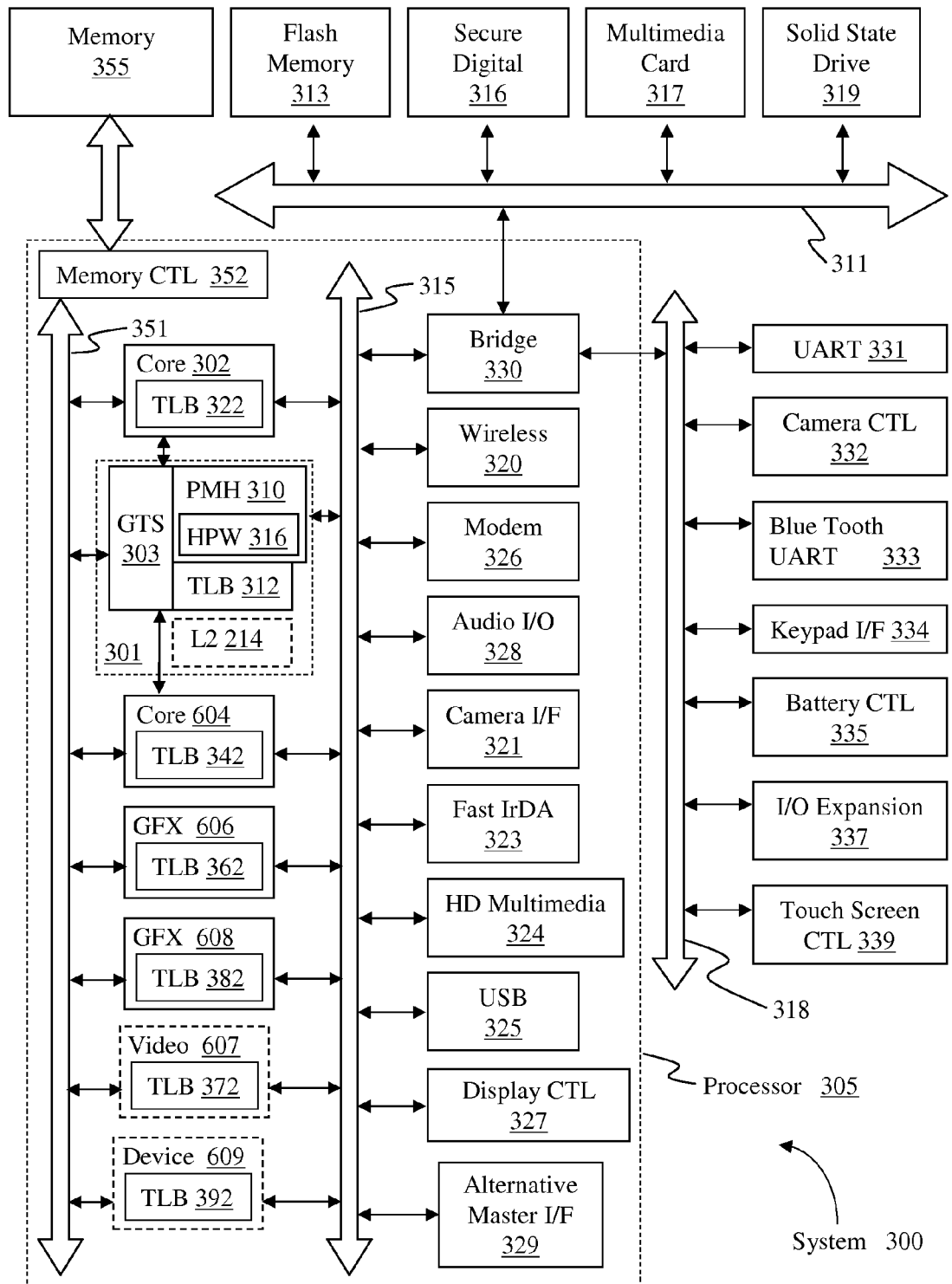
FIG. 3 illustrates one embodiment of a multithreaded processing system using a mechanism for efficiently and fairly scheduling shared resources among threads of instructions in a multithreaded processor.

FIG. 3 illustrates one embodiment of a multithreaded processing system using a mechanism for efficiently and fairly scheduling shared resources among threads of instructions in a multithreaded processor.

System 300 includes apparatus 301 of processor 305, which comprises TLB 312 to store virtual address translation entries. Page-miss handler, PMH 310, is coupled with the TLB 312 to facilitate page walks on page misses and to populate virtual address translation entries of TLB 312. For the sake of illustration TLB 312, HPW 316 and PMH 310 are shown as being included in apparatus 301 but it will be appreciated that portions of one or all may be implemented as separate or distributed hardware and/or software data structures and reside outside of apparatus 301, for example including in main memory 355.

Apparatus 301 also comprises GTS 303 and optionally comprises second level cache, L2 314, which are shown as being included in apparatus 301 but may be implemented as separate hardware or software and may reside outside of apparatus 301.

Apparatus 301 is operatively coupled with busses/interconnects 315 and 351 for communicating with multi-core processor 305 or a multi-core processing system having multiple processor cores or other processing devices, for sharing virtual memory, via memory control 352 through external memory 355, in the multi-core system.

Embodiments of system 300 may be implemented using standard or non-standard or proprietary technologies, interfaces, busses or interconnects 315 and 351 such as the (Peripheral Component Interconnect) PCI or PCI Express or (Serial Advanced Technology Attachment) SATA for communicating with a multi-core processor or multi-core processing system.

Other embodiments of system 300 may be implemented using standard or non-standard or proprietary technologies, interfaces, busses or interconnects—for example, the SPI (Serial Peripheral Interface) bus; the ISA (Industry Standard Architecture) bus, PC/104, PC/104+ and Extended ISA; USB (Universal Serial Bus) AVC (Audio Video Class); AMBA (Advanced Microcontroller Bus Architecture) (Advanced Peripheral Bus) APB; FireWire (*IEEE Std* 1394*a*-2000 *High Performance Serial Bus—Amendment* 1, ISBN 0-7381-1958-X; *IEEE Std* 1394*b*-2002 *High Performance Serial Bus—Amendment* 2, ISBN 0-7381-3253-5; *IEEE Std* 1394*c*-2006, 2007-06-08, ISBN 0-7381-5237-4); HDMI (High-Definition Multimedia Interface); the VESA's (Video Electronic Standards Association) DisplayPort and Mini DisplayPort; the MIPI® (Mobile Industry Processor Interface) Alliance's SLIMbus® (Serial Low-power Inter-chip Media Bus), LLI (Low Latency Interface), CSI (Camera Serial Interface) DSI (Display Serial Interface), etc.

System 300 may include multiple processor cores, two of which are shown as core 302 and core 304, as well as other processing devices such as graphics devices, two of which are shown as GFX 306 and GFX 308, and optionally other processing devices such as video device 307 and device 309.

The multiple processor cores 302 and 304 may be multithreaded cores processing multiple process threads for execution. Processor core 302 and core 304 may be coupled with various devices via a bus/interconnect 315, e.g. bridge 330, wireless connectivity device 320, modem device 326, and audio I/O devices 328. Some embodiments of system 300 may be implemented as a system on a chip, for example, to use in a tablet computer or a smart phone. In such embodiments wireless connectivity device 320 may provide a wireless LAN (local area network) link, modem device 326 may provide a 4G (fourth generation), or other telephone link, and audio I/O devices 328 may provide a set of audio human interface devices, for example, a headset, speakers, handset microphone, audio input and output channels, and amplifiers.

Processor cores 302 and 304 are coupled with bus/interconnect 315 for communicating with various other system devices, which may include but are not limited to wireless connectivity device 320, modem device 326, and audio I/O devices 328, camera interface 321, Fast IrDA (Infrared Data Association) port 323, HD (high definition) multimedia interface 324, USB 325, display control 327, and alternate master interface 329. Processor cores 302 and 304 are also coupled with bus/interconnect 315, bridge 330 and bus/interconnect 311 for communicating with various other system devices, which may include but are not limited to flash memory 313, SD (secure digital) memory 316, MMC (multimedia card) 317 and SSD (solid state drive) 319. Processor cores 302 and 304 are coupled with bus/interconnect 315, bridge 330 and bus/interconnect 318 for communicating with various other system devices, which may include but are not limited to UART (universal asynchronous receiver/transmitter) 331, camera control 332, Blue Tooth UART 333 optionally including a Wi-Fi 802.11 a/b/g transceiver and/or a GPS (Global Positioning System) transceiver, keypad 334, battery control 335, I/O expansion 337 and touch screen control 339.

Processor core 302 and core 304 may also be coupled with memory 355 via a bus/interconnect 351 and memory control 352. Processor core 302 and core 304 may also be coupled with graphics processing devices GFX 306 and GFX 308, and optionally other processing devices such as video device 307 and device 309 via memory 355 and bus/interconnects 315 and 351 and optionally via last level cache (not shown). Memory 355 and other tangible storage media of system 300 may record functional descriptive material including executable instructions to implement a process to use a shared page miss handler PMH 310 or shared HPW 316 for multiple processing cores or other devices to share virtual memory in a multi-core system.

Some embodiments of system 300 may adhere to industry standards which allow multiple operating systems running simultaneously within a single computer to natively share devices like Single Root I/O Virtualization (SRIOV), which provides native I/O virtualization in PCI Express topologies, or Multi-Root I/O Virtualization (MRIOV), which provides native I/O virtualization in topologies where multiple root complexes share a PCI Express hierarchy. Some embodiments of system 300 may include standard or non-standard or proprietary technologies, interfaces, busses or interconnects such as the SPI bus, USB, AMBA APB; FireWire, HDMI, Mini DisplayPort, MIPI SLIMbus, MIPI LLI, MIPI CSI, MIPI DSI, etc.

These multiple processing cores or other processing devices may share virtual memory address spaces via memory 355 and optionally through last level cache (not shown). Typically, the processor cores may have cache hierarchies, and TLBs, e.g. TLB 322 and TLB 342, respectively to cache virtual to physical address translations from a host or guest operating system page tables in a paged virtual memory system.

The graphics processing devices, GFX 306 and GFX 308, and optionally other processing devices such as video device 307 and device 309 may also have mechanisms such as TLBs, e.g. TLB 362, TLB 382, TLB 372 and TLB 392, respectively, for performing virtual to physical address translations. Various embodiments of TLB 362, TLB 382, TLB 372 and TLB 392, respectively, may or may not have the same capabilities, or capabilities comparable to processor cores 302 and 304.

If one or more of processor cores 302 and 304, graphics processing devices GFX 306, GFX 308, and optionally video device 307 and device 309, while accessing their TLBs via a TLB lookup, generate a page miss, then they may send a page miss requests to the shared PMH 310 of apparatus 301. Apparatus 301 may receive one or more page miss requests from one or more respective requesting devices of the plurality of devices, processor cores 302 and 304, graphics processing devices GFX 306, GFX 308, and optionally video device 307 and device 309, in the multi-core system.

When processing a page miss request from one of the requesting devices, apparatus 301 may include generational thread scheduler, GTS 303 in order to arbitrate and identify which page miss request of the one or more requesting threads to process. In some embodiments, GTS 303 may be used with processor cores 302 and 304 multithreading picker logic to pick threads for execution and to allocate a shared resource fairly, such as a shared PMH 310 and/or HPW 316 of apparatus 301, among the threads contending for access to the shared resource. Generational thread scheduler, GTS 303 can allocate the shared resource efficiently and fairly by granting a first requesting thread access to the shared resource and allocating a reservation for the shared resource to each requesting thread. Generational thread scheduler, GTS 303 then blocks the first thread from re-requesting the shared resource until every other thread that has been allocated a reservation, has also been granted access to the shared resource. Generation tracking state can be cleared by generational thread scheduler, GTS 303 when each requesting thread of the generation that was allocated a reservation has had access to the shared resource.

In some embodiments, portions of PMH 310 may be distributed and included in processor cores 302 and 304, or GTS 303 may allocate access to a shared PMH 310 separately from access to a shared HPW 316. Apparatus 301 may perform a second local TLB 312 lookup to satisfy the page miss request, and then upon a page miss in TLB 312, generational thread scheduler 303 may allocate access or a reservation to the shared HPW 316 to perform a page table walk and generate a physical address responsive to the first page miss request. Upon completion either by shared PMH 310 or by shared HPW 316 the physical address may be sent by communication logic of apparatus 301 to the device of the corresponding requesting thread, or a fault may be signaled by apparatus 301 to an operating system for the corresponding requesting thread responsive to the first page miss request.

It will be appreciated that whenever duplicate page miss requests are received by apparatus 301, if any duplicate request has been, or is being processed by PMH 310, the other duplicate requests may be allocated a reservation for PMH 310 and wait to be satisfied along with the first request. Thus duplication of page walks may be eliminated when virtual memory space is shared by more devices. Similarly, if the first request generates a page fault, duplicate page fault signals to the operating system may also be eliminated.

Figure 4:
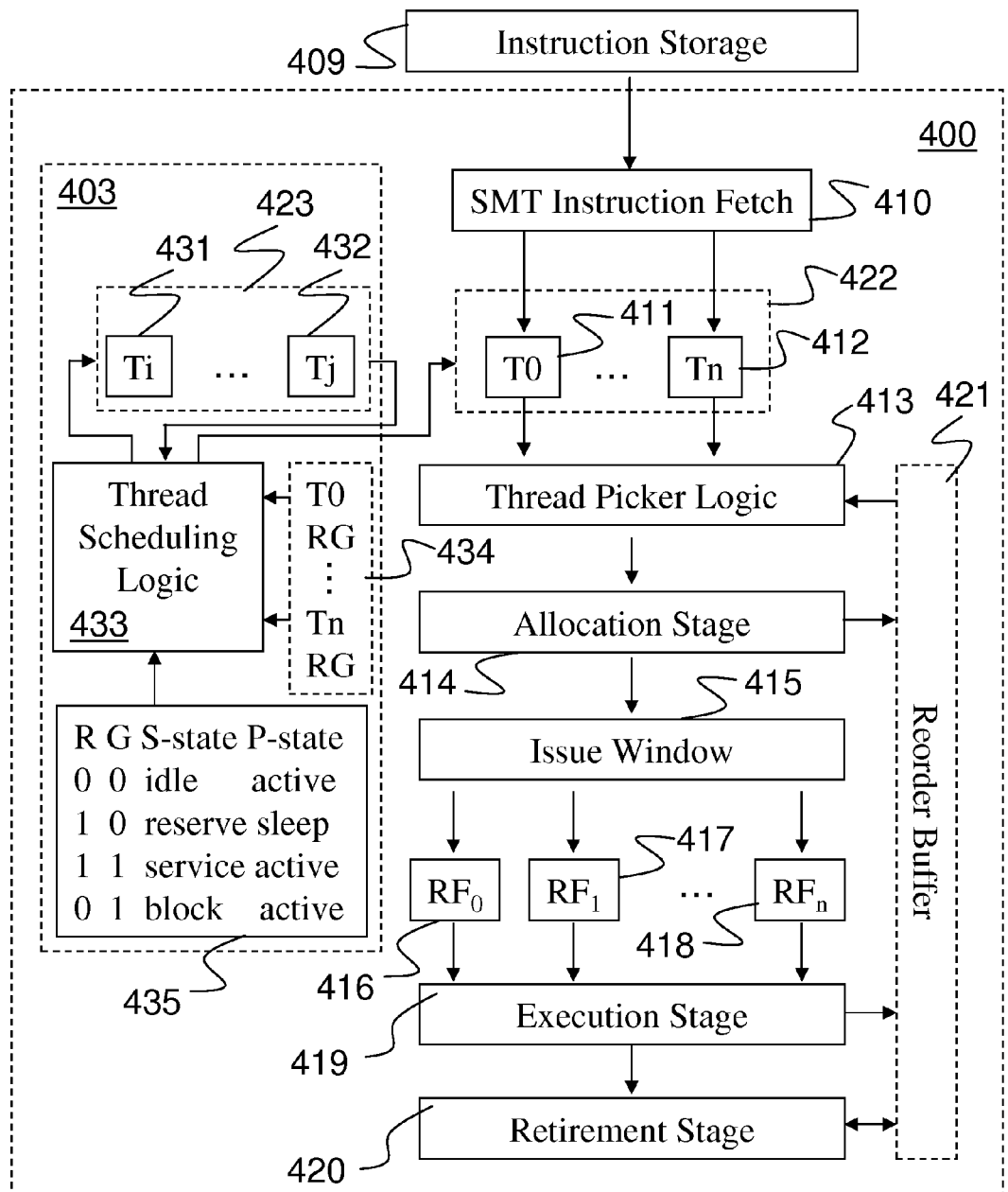
FIG. 4 illustrates one embodiment of a mechanism for efficiently and fairly scheduling shared resources among multiple threads of instructions.

FIG. 4 illustrates one embodiment of a mechanism 403 for efficiently and fairly scheduling shared resources among multiple threads of instructions.

In one embodiment of a processor pipeline 400 a selection process occurs among multiple execution threads T0 through Tn for simultaneous multithreading (SMT). Instruction storage 409 holds instructions of threads T0 through Tn, which are fetched for execution by SMT instruction fetch logic 410 and queued into thread queues 411 through 412 of active or sleeping threads 422.

Thread selection logic 413 may perform a selection process adapted to the resource requirements of threads T0 through Tn to avoid inter-thread starvation, and improve efficiency and fairness of resource allocation by use of a generational thread scheduler 403 as is described in greater detail below. Thread selection logic 413 may also prioritize any remaining threads in order to select new instructions to be forwarded to allocation stage 414.

In allocation stage 414 certain resources may be allocated to the instructions. In some embodiments, for example, registers may be renamed and allocated from the physical registers of register files in accordance with register alias table entries for each thread.

In issue window 415 instructions of threads T0 through Tn occupy entries and await issuance to their respective register files and execution units. In some embodiments, for example, integer instructions may be issued to receive operands, for example from GEN REGS 135*b* or 155*b*, for execution in an integer arithmetic/logical unit (ALU) for example 137*b* or 157*b*; floating point instructions may be issued to receive operands, for example from FP/SIMD REGS 135*a* or 155*a*, for execution in a floating point adder or floating point multiplier, etc. of FP/SIMD EXU 137*a* or 157*a*; and single instruction multiple data (SIMD) instructions may be issued to receive operands, for example from FP/SIMD REGS 135*a* or 155*a*, for execution in a SIMD ALU, SIMD shifter, etc. of FP/SIMD EXU 137*a* or 157*a*.

After instructions are issued, they receive their operand registers from their respective register files, for example 135*a*, 155*a*, 135*b* or 155*b*, as they become available and then proceed to execution stage 419 where the are executed either in order or out of order to produce their respective results. In the case of memory operands, either a memory read, perhaps prior to execution stage 419, or a memory write, perhaps following execution stage 419, may be performed. If one or more instructions of threads T0 through Tn, while accessing their TLBs via a TLB lookup, generate a page miss, then they may send a page miss requests to a shared page miss handler, for example PMH 110 of apparatus 101. Apparatus 101 may receive one or more page miss requests from one or more respective requesting threads T0 through Tn, for example of processor cores 102 and/or 104, in a multi-core system.

When processing a page miss request from one of the requesting devices, apparatus 101 may include generational thread scheduler (GTS) 403 in order to arbitrate and identify which page miss request of the one or more requesting threads 423, Ti 431 to Tj 432, to process. In some embodiments, GTS 403 may be used with the processor core thread picker logic 413 to pick threads for execution and to allocate a shared resource (such as a shared PMH 110 and/or HPW 116 of apparatus 101) fairly among the threads contending for access to the shared resource.

Generational thread scheduler, GTS 403 can allocate the shared resource efficiently and fairly by granting a first requesting thread access to the shared resource and allocating a reservation for the shared resource to each requesting thread. Generational thread scheduler, GTS 403 then blocks the threads from re-requesting the shared resource until every other thread that has been allocated a reservation, has also been granted access to the shared resource. Generation tracking state 434 can be cleared by thread scheduling logic 433 when each requesting thread of the generation that was allocated a reservation has had access to the shared resource.

In embodiments that optionally execute instructions out of sequential order, retirement stage 420 may employ a reorder buffer 421 to retire the instructions of threads T0 through Tn in their respective original sequential orders.

In some embodiments a set of generational tracking states 434 (for example of threads 423) and thread picker 413 states (for example of threads 422) may be recorded and/or interpreted according to table 435 as follows for generational tracking states 434:

IDLE for a reservation state R=0, and a granted state G=0;
RESERVE for a reservation state R=1, and a granted state G=0;
SERVICE for a reservation state R=1, and a granted state G=1;
BLOCK for a reservation state R=0, and a granted state G=1.

For thread picker 413 states, a thread may have the SLEEP state: after it has made a request and been allocated a reservation (and not granted access to the shared resource), after it has been granted access and while its request is being serviced, and after it has been blocked from making a new request. A thread may have the ACTIVE state: whenever any request is completed (either the thread's own request or any other thread's request). In the ACTIVE state, the thread may generate a new request, or may repeat the same request if the request was previously not granted.

Figure 5:
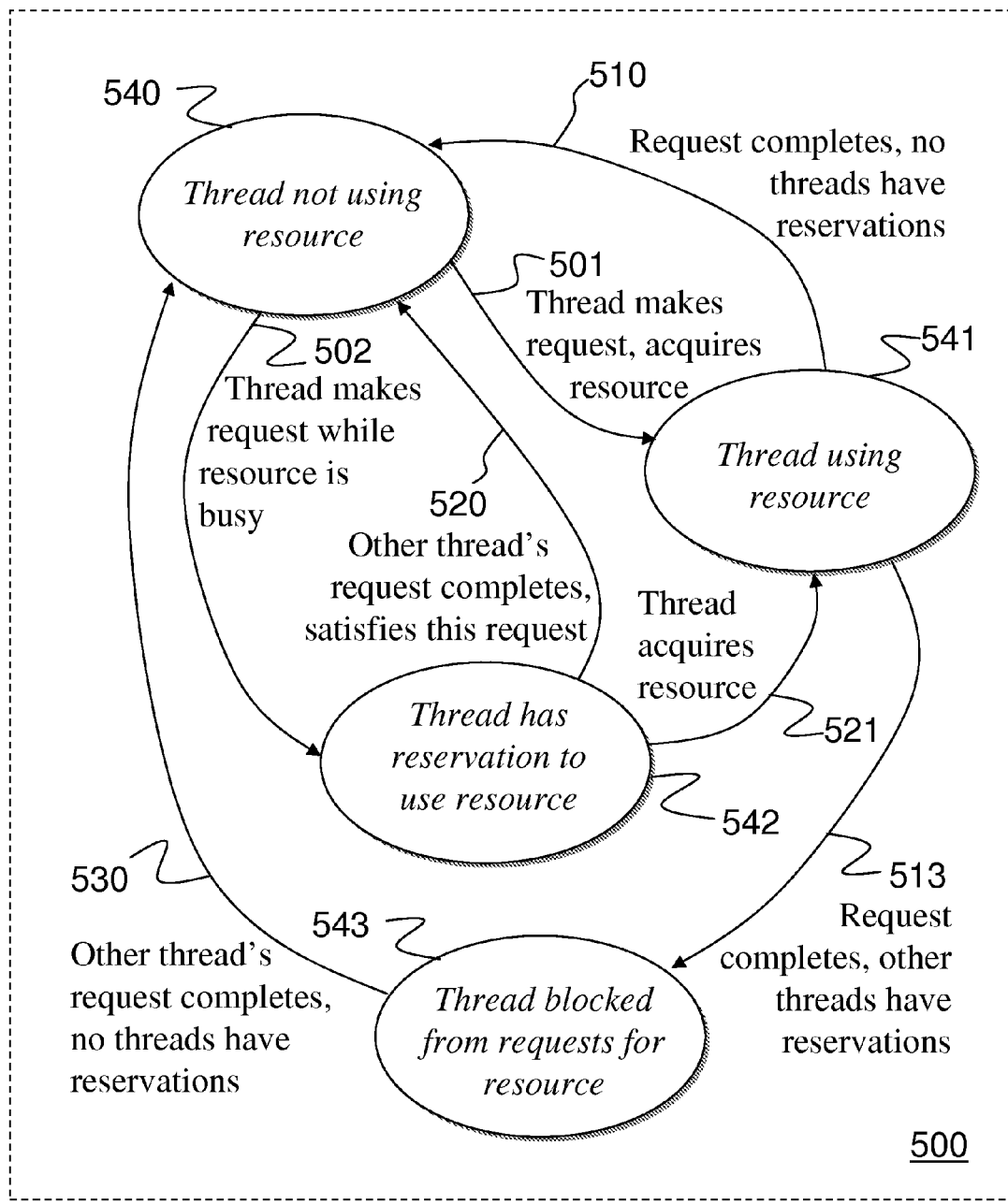
FIG. 5 illustrates one embodiment of a state machine for a mechanism to efficiently and fairly schedule shared resources among multiple threads of instructions.

FIG. 5 illustrates one embodiment of a state machine 500 for a mechanism to efficiently and fairly schedule shared resources among multiple threads of instructions. For one embodiment a state machine 500 may be dynamically built, stored and maintained, for example by thread scheduling logic 433 of generational thread scheduler, GTS 403, for each outstanding and completed request for a shared resource during a request generation. For another embodiment separate sets of state machines 500 may be dynamically built, stored and maintained, for each instance of a shared resource during a request generation. For an alternative embodiment one collective state machine 500 may be dynamically built, stored and maintained, for all instances of a particular type of resources during a request generation.

Beginning in state 540 a requesting thread is not using the shared resource. In one embodiment in state 540 of state machine 500 a reservation state R=0, and a granted state G=0. Upon a request being made by the thread to access the shared resource, a generational thread scheduler can allocate the shared resource efficiently and fairly by granting the requesting thread access to the shared resource wherein according to state transition 501, the requesting thread acquires the resource and moves to state 541, or by allocating a reservation for the shared resource to the requesting thread, wherein according to state transition 502, the requesting thread moves to state 542. For one embodiment, in state 542 the reservation state R may be set to one (1), and the granted state G may remain at zero (0). In state 542, the requesting thread has a reservation to use the shared resource and either the thread will eventually be granted access to the shared resource by the generational thread scheduler, wherein according to state transition 521, the requesting thread acquires the resource and moves to state 541, or the thread's request may be satisfied by another thread's duplicate request, wherein according to state transition 520, the requesting thread returns to state 540. For one embodiment, in state 541 both the reservation state R and the granted state G may be set to one (1) regardless of which state transition 501 or 521 resulted in the requesting thread acquiring the resource.

Upon completion of the request from the thread by the shared resource, a generational thread scheduler can determine if every other thread that has been allocated a reservation, has also been granted access to the shared resource (i.e. when no other threads have outstanding reservations) wherein according to state transition 510, the requesting thread moves to state 540; or when one or more other threads have a reservation for the shared resource, then according to state transition 513, the thread moves to state 543 and is blocked from re-requesting the shared resource. For one embodiment, in state 543 the reservation state R may be reset to zero (0), and the granted state G may remain at one (1).

For one embodiment of state machine 500, a generational thread scheduler can determine when every thread that has been allocated a reservation, has also been granted access to the shared resource by checking if any reservation state R is still set to one (1), in which case all threads in state 543 are blocked from re-requesting the shared resource. Upon completion of the requests from any other threads, their reservation states R may be reset to zero (0). Therefore, when no remaining reservation state R is set to one (1) the current generation of requests is completed, wherein according to state transition 530, the thread moves from state 543 to state 540.

Figure 6:
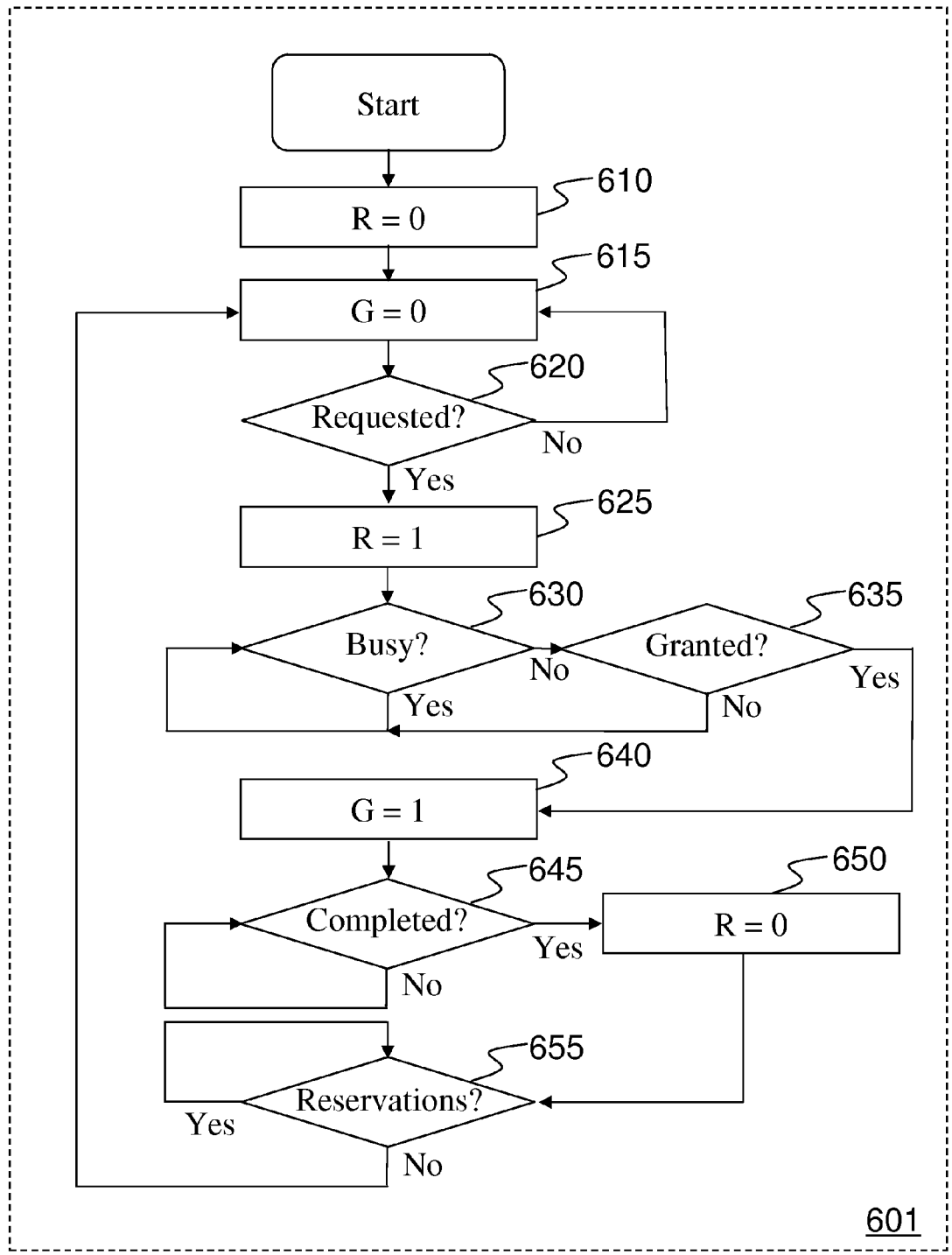
FIG. 6 illustrates a flow diagram for one embodiment of a process to efficiently and fairly scheduled shared resources among threads of instructions in a multithreaded processor.

FIG. 6 illustrates a flow diagram for one embodiment of a process 601 to efficiently and fairly scheduled shared resources among threads of instructions in a multithreaded processor. Process 601 and other processes herein disclosed are performed by processing blocks that may comprise dedicated hardware or software or firmware operation codes executable by general purpose machines or by special purpose machines or by a combination of both.

In processing block 610 a reservation state R is initialized to store a value of zero (0). In processing block 615 a granted state G stores a value of zero (0). In processing block 620 a determination is made whether or not access to the shared resource is requested. If not processing returns to processing block 615. Otherwise processing proceeds to processing block 625 where a reservation state R is set to one (1) to signify that a corresponding requesting thread has a reservation for the shared resource. In processing block 630 the resource is checked to see if it is busy. If so the requesting thread waits at processing block 630 until the shared resource is available. When it is determined in processing block 630 that the shared resource is not busy processing proceeds to processing block 635 where a determination is made by generational thread scheduler whether the present request should be granted. If not, processing returns to processing block 630. Otherwise, the requesting thread is granted access to the shared resource and processing proceeds to processing block 640 where a granted state G is set to store a value of one (1). In processing block 645 the resource is checked to see if it has completed the present request. If not the requesting thread waits at processing block 645 until the request has been completed by the shared resource. Upon completion of the request from the current thread by the shared resource, processing proceeds to processing block 650 where a reservation state R is reset to store a value of zero (0). Then in processing block 650 a generational thread scheduler can determine when every thread that has been allocated a reservation, has also been granted access to the shared resource by checking if any reservation state R is still set to one (1), in which case the present threads is blocked from re-requesting the shared resource and waits at processing block 655. When it is determined in processing block 655 that no reservation state R is still set to one (1)

processing proceeds to processing block 615 where the granted state G for the present thread is reset to store a value of zero (0). Thus generation tracking state is cleared by the generational thread scheduler when each requesting thread of the generation that was allocated a reservation has had access to the shared resource.

It will be appreciated that embodiments of process 601 may execute processes of its processing blocks in a different order than the one illustrated or in parallel with other processing blocks when possible. For one embodiment a process 601 may be dynamically maintained, for example by thread scheduling logic 433 of generational thread scheduler, GTS 403, for each outstanding and completed request for a shared resource during a request generation. For another embodiment separate sets of processes 601 may be dynamically maintained, for each instance of a shared resource during a request generation.

Figure 7:
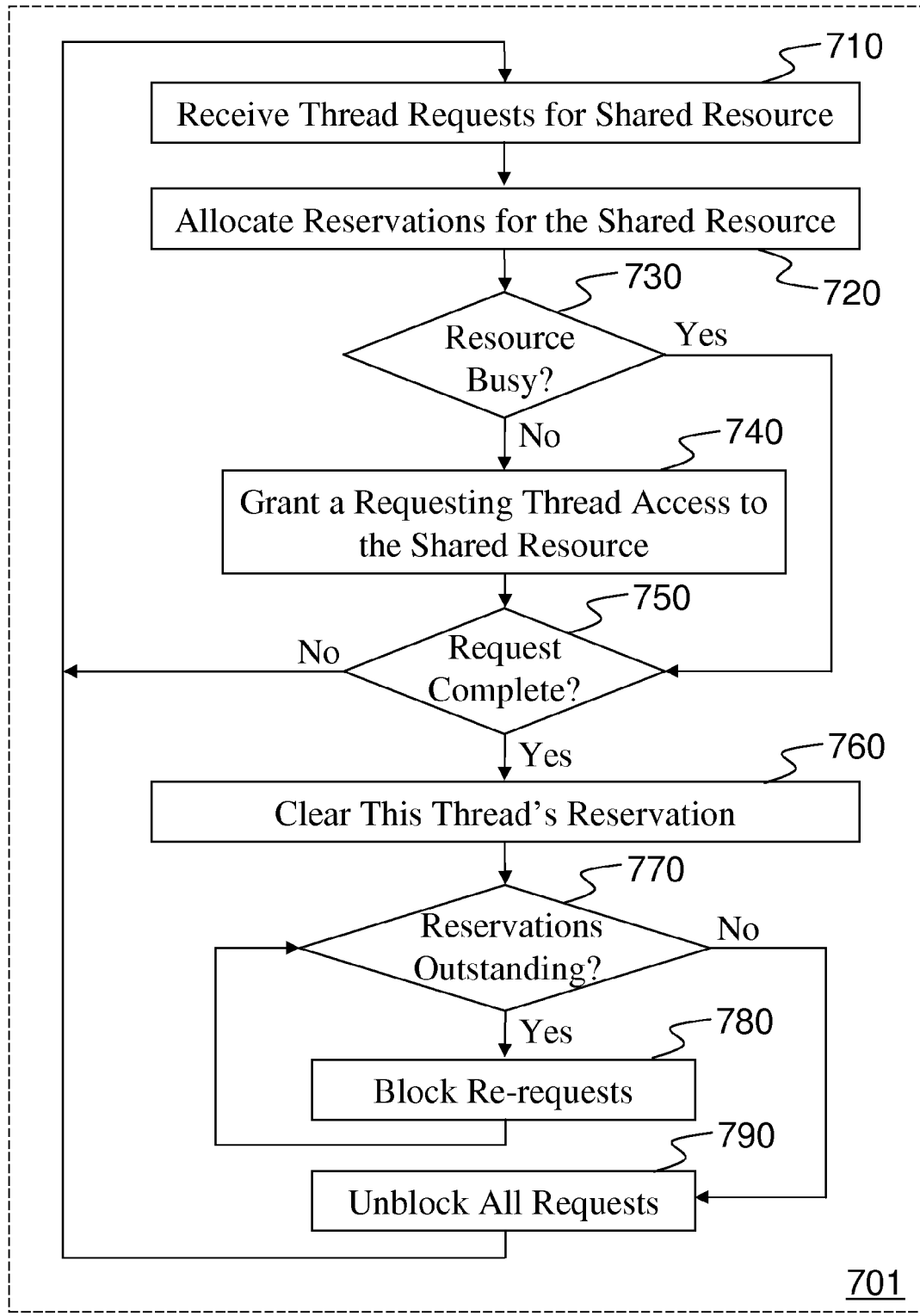
FIG. 7 illustrates a flow diagram for an alternative embodiment of a process to efficiently and fairly scheduled shared resources among threads of instructions in a multithreaded processor.

FIG. 7 illustrates a flow diagram for an alternative embodiment of a process 701 to efficiently and fairly scheduled shared resources among threads of instructions in a multithreaded processor. In processing block 710 new thread requests for a shared resource are received by a generational thread scheduler. In processing block 720 reservations are allocated to the new requesting threads for the shared resource. In processing block 730 the resource is monitored to see if it is busy. If not a requesting thread is granted access to the shared resource in processing block 740 and processing proceed to processing block 750. Otherwise processing proceeds directly to processing block 750 where the resource is monitored to see if the current granted request is complete. If not processing continues in processing block 710. Otherwise when a request is completed in processing block 750, processing proceeds to processing block 760 where the granted thread's reservation is cleared. Processing then proceeds to processing block 770 where the generational thread scheduler determines if any thread that has been allocated a reservation, has not been granted access to the shared resource by checking if any reservations are still outstanding, in which case threads are blocked from re-requesting the shared resource in processing block 780 until every thread that has been allocated a reservation, has been granted access to the shared resource. Otherwise all requests for the shared resource are unblocked in processing block 790. Processing then continues in processing block 710.

It will be appreciated that embodiments of process 701 may execute processes of its processing blocks in a different order than the one illustrated or in parallel with other processing blocks when possible.

Thus, a generational thread scheduler may allocate a shared processor execution resource fairly over each generation of requests among requesting threads of executable instructions contending for access to the shared resource. Such a mechanism may avoid unbalanced degradation in performance for some threads due to unfair allocation of shared processor execution resources during periods of contention for access to those resources.

The above description is intended to illustrate preferred embodiments of the present invention. From the discussion above it should also be apparent that especially in such an area of technology, where growth is fast and further advancements are not easily foreseen, the invention can may be modified in arrangement and detail by those skilled in the art without departing from the principles of the present invention within the scope of the accompanying claims and their equivalents.

What is claimed is:

1. A method for sharing a resource in a multiprocessing system, the method comprising:
receiving, from a first plurality of requesting threads in a processor, requests for a shared resource;
granting a first thread of the first plurality of requesting threads access to the shared resource; allocating a reservation to other threads of the first plurality of requesting threads for the shared resource; and
blocking the first thread from re-requesting the shared resource at least until each thread of the first plurality of requesting threads has been granted access to the shared resource.

2. The method of claim 1 further comprising:
granting a second thread of the first plurality of requesting threads access to the shared resource; and
blocking the second thread from re-requesting the shared resource at least until each thread of the first plurality of requesting threads has been granted access to the shared resource.

3. The method of claim 2 further comprising:
allocating a reservation to each thread of a second plurality of requesting threads for the shared resource; and
blocking the first and second thread from re-requesting the shared resource at least until each thread of the second plurality of requesting threads has been granted access to the shared resource.

4. An article of manufacture comprising:
a non-transitory machine-accessible medium including data and instructions for allocating a shared resource among a plurality of threads such that, when accessed by a machine, cause the machine to:
grant a first requesting thread of the plurality of threads access to the shared resource;
allocate a reservation for the shared resource to each requesting thread of the first plurality of threads; and
block the first thread from re-requesting the shared resource at least until no thread of the plurality of threads has been allocated a reservation but has not yet been granted access to the shared resource.

5. The article of manufacture of claim 4, said non-transitory machine-accessible medium including data and instructions that, when accessed by a machine, cause the machine to:
grant a second requesting thread of the plurality of threads access to the shared resource; and
block the first and second threads from re-requesting the shared resource at least until there are none of the plurality of threads that, after being allocated a reservation, were not then granted access to the shared resource.

6. The article of manufacture of claim 5, said non-transitory machine-accessible medium including data and instructions that, when accessed by a machine, cause the machine to:
allocate a reservation for the shared resource to each requesting thread of the plurality of threads that has not already been granted access to the shared resource; and
clear a first state variable when each thread of the plurality of threads that was allocated a reservation has had their request satisfied.

7. A processor comprising:
multithreading logic to execute a plurality of threads of executable instructions;
a shared resource to be allocated fairly among threads of the plurality of threads of executable instructions contending for access to the shared resource;

a thread scheduling logic to allocate the shared resource among the plurality of threads of executable instructions by:
  granting a first requesting thread of the plurality of threads of executable instructions access to the shared resource;
  allocating a reservation for the shared resource to requesting threads of the first plurality of threads of executable instructions; and
  blocking the first thread from re-requesting the shared resource at least until every thread of the plurality of threads of executable instructions that has been allocated a reservation, has been granted access to the shared resource.

8. The processor of claim 7, said thread scheduling logic to further allocate the shared resource among the plurality of threads of executable instructions by:
  granting a second requesting thread of the plurality of threads of executable instructions access to the shared resource; and
  blocking the first and second thread from re-requesting the shared resource at least until every thread of the plurality of threads of executable instructions that has been allocated a reservation, has been granted access to the shared resource.

9. The processor of claim 7, said thread scheduling logic to further allocate the shared resource among the plurality of threads of executable instructions by:
  blocking all threads from re-requesting the shared resource until every thread of the plurality of threads of executable instructions that has been allocated a reservation, has been granted access to the shared resource.

10. The processor of claim 7, said thread scheduling logic to further allocate the shared resource among the plurality of threads of executable instructions by:
  allocating a reservation for the shared resource to each requesting thread of the plurality of threads of executable instructions that has not already been granted access to the shared resource; and
  clearing a first state variable for each thread of the plurality of threads of executable instructions that has been allocated a reservation if it has been granted access to the shared resource.

11. The processor of claim 10, said thread scheduling logic to further allocate the shared resource among the plurality of threads of executable instructions by:
  maintaining the first state variable for each thread of the plurality of threads of executable instructions having an outstanding or completed request, until every thread that has been allocated a reservation, has been granted access to the shared resource.

12. A processor comprising:
  simultaneous multithreading logic to execute a plurality of threads of executable instructions;
  one or more cache memories to store a copy of one or more portions of data and/or executable instructions from an addressable memory, at least in part through the use of a shared resource;
  a finite-state machine for allocating the shared resource among the plurality of threads of executable instructions, said finite-state machine to:
    grant a first requesting thread of the plurality of threads of executable instructions access to the shared resource;
    allocate a reservation for the shared resource to requesting threads of the first plurality of threads of executable instructions; and
    block the first thread from re-requesting the shared resource at least until no thread of the plurality of threads of executable instructions has been allocated a reservation but has not been granted access to the shared resource.

13. The processor of claim 12, said finite-state machine to:
  block all threads from re-requesting the shared resource until every thread of the plurality of threads of executable instructions that has been allocated a reservation, has also been granted access to the shared resource.

14. The processor of claim 12, said finite-state machine to:
  allocate a reservation for the shared resource to each requesting thread that has not already been granted access to the shared resource; and
  clear a first state variable for each thread that has been allocated a reservation if it has been granted access to the shared resource.

15. The processor of claim 14, said finite-state machine to:
  maintain the first state variable for each thread having an outstanding or completed request, until every thread that has been allocated a reservation, has been granted access to the shared resource.

16. A computing system comprising:
  an addressable memory to store data and also to store executable instructions;
  one or more cache memories to store a copy of one or more portions of the data and/or the executable instructions stored in the addressable memory, at least in part through the use of a shared resource;
  a multiprocessor including simultaneous multithreading logic to execute a plurality of threads of executable instructions, the multiprocessor operatively coupled with the addressable memory and including a finite-state machine for allocating the shared resource among the plurality of threads of executable instructions, said finite-state machine to:
    grant a first requesting thread of the plurality of threads of executable instructions access to the shared resource;
    allocate a reservation for the shared resource to requesting threads of the first plurality of threads of executable instructions; and
    block the first thread from re-requesting the shared resource at least until no thread of the plurality of threads of executable instructions has been allocated a reservation but has not yet been granted access to the shared resource.

17. The computing system of claim 16, said finite-state machine to:
  allocate a reservation for the shared resource to each requesting thread that has not already been granted access to the shared resource; and
  clear a first state variable for each thread that has been allocated a reservation if it has been granted access to the shared resource.

18. The computing system of claim 17, said finite-state machine to:
  maintain the first state variable for each thread having an outstanding or completed request, until every thread that has been allocated a reservation, has been granted access to the shared resource.

19. The computing system of claim 16, finite-state machine to:
  grant a second requesting thread of the plurality of threads of executable instructions access to the shared resource; and block the first and second thread from re-requesting the shared resource at least until every thread of the plurality of threads of executable instructions that has been allocated a reservation, has been granted access to the shared resource.

20. The computing system of claim 19, said finite-state machine to:
block all threads from re-requesting the shared resource until every thread of the plurality of threads of executable instructions that has been allocated a reservation, has also been granted access to the shared resource.

* * * * *